US006477248B1

(12) United States Patent
Bruhnke et al.

(10) Patent No.: US 6,477,248 B1
(45) Date of Patent: *Nov. 5, 2002

(54) MULTI-LINE STATION INTERFACE

(75) Inventors: Howard Bruhnke, deceased, late of Massapequa, NY (US), by Joan M. Bruhnke, executrix; Eric J. Wilner, Sunnyvale; Boris Reynov, San Jose, both of CA (US)

(73) Assignee: Teleport Communications Group Inc., Staten Island, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/058,534

(22) Filed: Apr. 10, 1998

(Under 37 CFR 1.47)

Related U.S. Application Data

(63) Continuation-in-part of application No. 08/867,040, filed on Jun. 4, 1997, which is a continuation of application No. 08/458,641, filed on Jun. 2, 1995, now abandoned.

(51) Int. Cl.[7] .............................. H04M 1/00; H04M 1/64
(52) U.S. Cl. .............................. 379/399.01; 379/88.12; 379/156; 379/165; 379/387.9
(58) Field of Search .......................... 379/67.1, 82, 84, 379/87, 88.04, 88.12, 88.16, 88.22, 88.25–88.27, 201, 207, 210–211, 242, 387, 399, 156, 164–165, 177, 182

(56) References Cited

U.S. PATENT DOCUMENTS

| 5,048,080 | A | * | 9/1991 | Bell et al. ..................... 379/165 |
| 5,214,689 | A | * | 5/1993 | O'Sullivan .................. 379/201 |
| 5,251,254 | A | * | 10/1993 | Tanigawa et al. ............ 379/165 |
| 5,313,517 | A | * | 5/1994 | Inaguma ..................... 379/67.1 |
| RE34,735 | E | * | 9/1994 | Tsaul Kuabe T, et al. .... 379/84 |
| 5,422,949 | A | * | 6/1995 | Tsukagoshi .................. 379/399 |
| 5,467,395 | A | * | 11/1995 | Izumi .......................... 379/399 |
| 5,563,938 | A | * | 10/1996 | Soshea et al. .............. 379/201 |
| 5,694,456 | A | * | 12/1997 | Carter et al. ................ 379/67.1 |
| 5,903,643 | A | * | 5/1999 | Bruhnke ...................... 379/399 |

* cited by examiner

*Primary Examiner*—Curtis Kuntz
*Assistant Examiner*—George Eng
(74) *Attorney, Agent, or Firm*—Scully, Scott, Murphy & Presser

(57) ABSTRACT

An interface device is disclosed for simultaneously connecting access lines to stations. Any one of the stations answers an incoming call from any one of the access lines. The interface device has line access modules each connected to a respective access line, and station access modules each connected to a respective station. A switching network selectively connects at least one of the line access modules to at least one of the station access modules. The switching network is controlled by a control unit in accordance with a predetermined sequence stored in the control unit or selected signals received from the stations through the station access modules. A speech synthesizer provides an audio signal to the stations indicating status the interface device, as well as available features and options of the interface device and the access lines. The control unit provides internal bridging of station access modules to the same access line module. In a private mode, the control unit prevents further connections and interruptions of a private connection between a station access module and an access line module. In response to a ring signal from one of the access lines, the control unit provides a ringing tone to all or selected stations which have no calls in progress, and optionally provides a line waiting tone to the stations which have calls in progress.

37 Claims, 10 Drawing Sheets

MULTI-LINE STATION INTERFACE

RELATED APPLICATION

This is a continuation-in-part of copending application Ser. No. 08/867,040 filed on Jun. 4, 1997, which is a continuation of application Ser. No. 08/458,641 filed on Jun. 2, 1995, now abandoned.

FIELD OF THE INVENTION

The present invention relates generally to interface devices for providing telephone services to customers, and in particular, to a multi-line interface device that enables an additional secondary phone service provider to provide telephone service to/from premises which are already furnished with telephone lines of an existing primary telephone service provider, the device being installed in the premises without the need to provide additional telephone devices, and, without the intrusion and necessity of significant rewiring.

DESCRIPTION OF THE PRIOR ART

Adding secondary telephone service to a residence or small business location ("premises") presents significant difficulties in reconfiguring the premises for the multi-line services. For instance, there is a very strong probability that existing telephone services of a primary service provider or local exchange company ("LEC") will not be disconnected initially. Consequently, the existing customer-owned inside wire and single line telephones will remain in place and the new service provider is faced with the dilemma of installing a new telephone(s) within the premises which would require additional telephone(s) and necessitate the rewiring of the premises. Although the existence of quad wire may someday overcome some of the problems involved in providing multiple-line connections, it is very doubtful that continuity exists for the second line and rewiring is necessary at the phone demarc to intercept and redirect a spare pair of wires to the alternate service provider. Furthermore, each location where a second phone is to be added must be rewired to receive an RJ-11 plug from the new telephone.

It is the case that the complexity of installing a second telephone adjacent to an existing one is both costly and not conducive to customers' preferences. Rewiring within the customer premises, either to install an additional line or to change existing wiring with multi-line cables, involves a level of expense which most residential customers will not voluntarily change. Many residential customers will chose to forgo a multi-line service rather than incur the cost of rewiring.

A few of the conventional ways for accommodating the addition of a new telephone is shown in FIGS. 1(a)–1(c), where: FIG. 1(a) illustrates the "bridging" of two telephones 11a and 11b by connecting respective plug blocks 12a and 12b to the demarc connecting block 20 connecting the LEC line 50; FIG. 1(b) illustrates the wiring of an existing telephone plug block 12a for connection to a second block 12b for accommodating a second telephone 11b; and, FIG. 1(c) illustrates the removal of a first telephone plug block 12a for replacement with a second dual plug block 15 to connect two telephones 11a and 11b to the LEC demarc.

Another alternative is to change out the existing telephone 11a with a dual line telephone 11c, as shown in FIG. 1(d). However, phone replacement costs are high and in the case of portables, very expensive.

Another adverse condition of rewiring or changing wall telephones is the potential for damage. Inevitably, wallpaper is torn, painted areas are chipped, and, the replacement phone in all likelihood will not be in the old area. In the case of wall phones, access to concealed wiring is necessary, which ultimately requires removing the phone to access the wiring in the wall and exposing the provider to potential damage claims. The aforementioned solutions are not favorable to the customer and are costly to the new service provider.

Furthermore, it is more often the case that premises with multiple telephones and a secondary telephone provider service (second line) will have the second line terminated on only one phone. This is due to the need to rewire and the associated cost involved in connecting the second line to EACH phone. Thus, with only one phone connected to the second line, customer usage of the new telephone service provider's network is minimal.

To circumvent all of aforementioned pitfalls, it would be highly desirable to install in premises having the need for multiple telephone line services provided by primary and secondary telephone service providers, a multi-functional interface box that will provide significant physical advantages to the customer while assuring the secondary service provider traffic on his network.

SUMMARY OF THE INVENTION

It is an object of the present invention to provide a multi-line interface device for providing multiple telephone line services to a home/office that is easy to install at a minimum cost.

Another object of the present invention is to provide a multi-line interface device which is optionally in series between each individual telephone station and the available central office dial tone lines of the primary and secondary provider.

A further object of the invention is to provide a multi-line interface device which is provided with an intelligent microcontroller and switching matrix for routing calls made from any connected telephone station to any central office line, or, routing of calls received from any central office (C.O.) line to any telephone station.

Still a further object of the invention is to provide a multi-line interface device which is provided with a novel call-waiting function for incoming calls, the function generating a call waiting indication tone for receipt by a telephone station having a call in progress, while simultaneously enabling ringing on other common bridged telephones connected to the device that are not in use (on-hook).

Yet a further object of the invention is to provide a multi-line interface device which performs call waiting features across multiple service lines.

Still another object of the present invention is to provide a multi-line interface device which makes cost savings decisions available to the consumer by allowing them to choose between service providers automatically to obtain the least cost routing of their calling needs.

Furthermore, an object of the invention is to provide a multi-line interface device which is configured for interfacing various equipment, e.g., single-line and multi-line telephones and PC or FAX modems, etc. with various service providers, e.g., telephone companies, cable television companies, etc.

Yet even further, an object of the invention is to provide a multi-line interface device which is for use with the evolving Hybrid Fiber Coax (HFC) networks being deployed by Multiple System Operators (MSOS) or Cable TV companies today. The integral use of fiber optic technology in the loop enables the network to be more reliable and secure versus the traditional copper based telephone plant.

A still further object of the invention is to provide a multi-line interface device which includes a speech synthesizer for announcing the various programming modes, options and status of the device.

These and other objects of the present invention are attained with an interface device for simultaneously connecting various access lines to various stations. Any one of the stations answers an incoming call from any one of the access lines. The interface device has line access modules each connected to a respective access line, and station access modules each connected to a respective station. A switching network selectively connects at least one of the line access modules to at least one of the station access modules.

The switching network is controlled by a control unit in accordance with a predetermined sequence stored in the control unit or selected signals received from the stations through the station access modules. A speech synthesizer provides an audio signal to the stations indicating status the interface device, as well as available features and options of the interface device and the access lines.

The control unit provides internal bridging of station access modules to the same access line module. In a private mode, the control unit prevents further connections and interruptions of a private connection between a station access module and an access line module. In response to a ring signal from one of the access lines, the control unit provides a ringing tone to all or selected stations which have no calls in progress, and optionally provides a line waiting tone to the stations which have calls in progress.

In response to ring signals from the access lines, the control unit provides different ringing tones to the stations for differentiating between the access lines. When power to the interface device is interrupted, the control unit provides configurable default connections of the stations to one or more of the access lines.

Each of the line access modules includes a ring detect circuit which detects a ring current from one of the access lines and converts the ring current to a digital logic signal which is provided to the control unit; a current sense circuit which detects when the access line is active; and a hold circuit which provides a path for a line current when the respective access line is on hold.

Each of the station access modules includes a current detect module which alerts the control unit when a respective one of the stations is off hook; and a local office unit which simulates the station.

BRIEF DESCRIPTION OF THE DRAWINGS

Further features and advantages of the invention will become apparent from a consideration of the following detailed description given with reference to the accompanying drawings, which specify and show preferred embodiments of the invention, wherein like elements are designated by identical references throughout the drawings; and in which.

DETAILED DESCRIPTION OF THE PREFERRED EMBODIMENTS

Figure 1A:
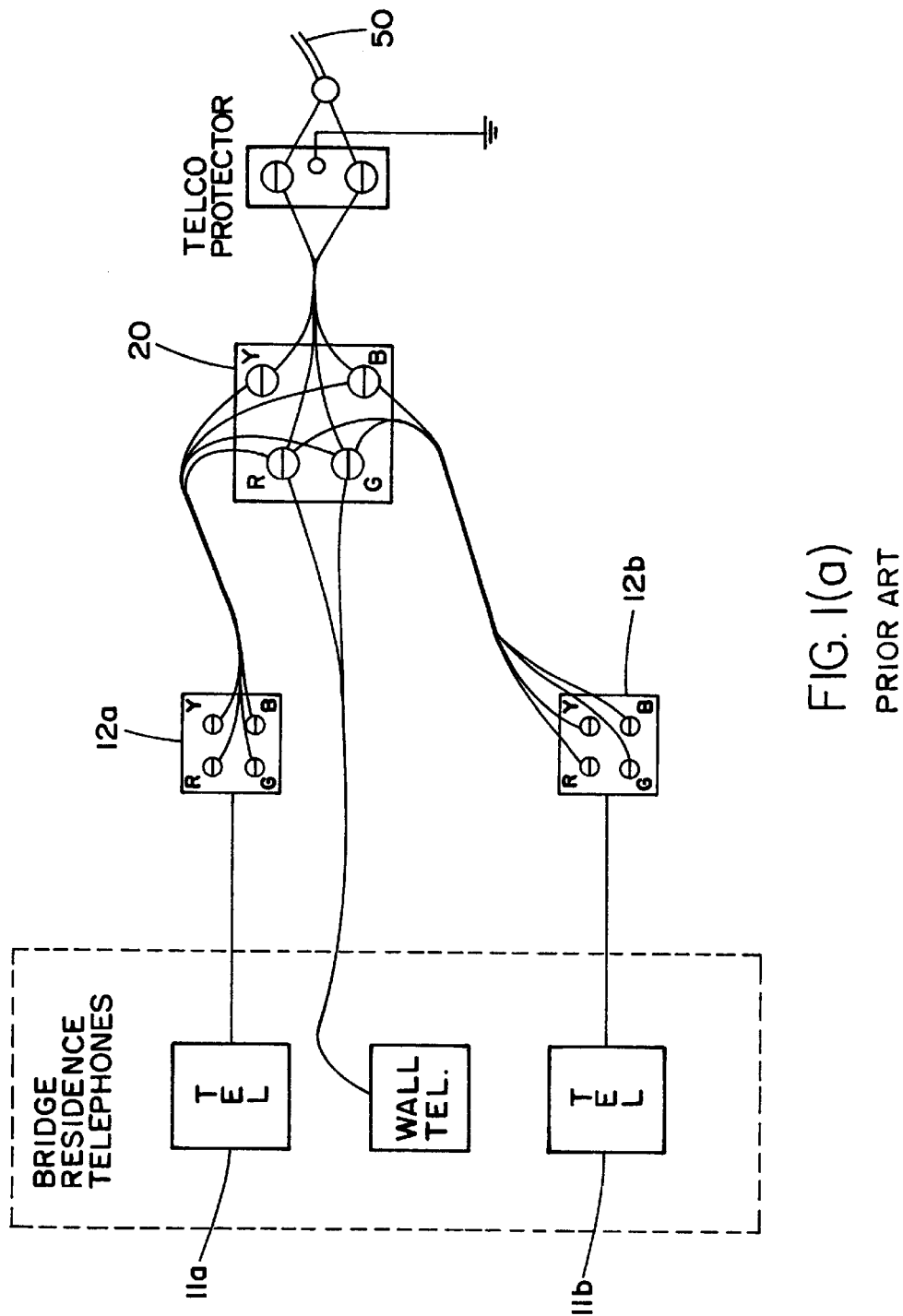
FIGS. 1(a)–1(d) illustrate prior art and conventional methods for adding phone to household/business premises.
Figure 1B:
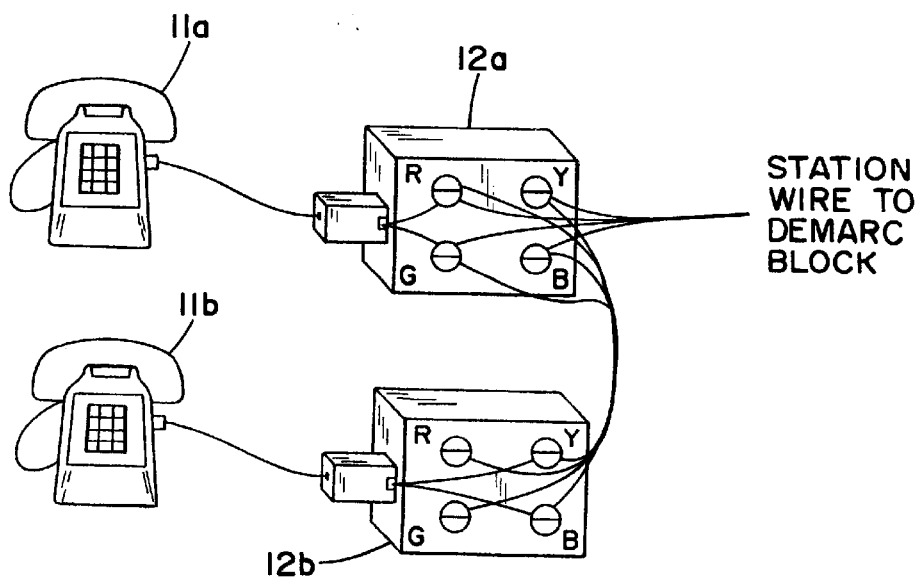
Figure 1C:
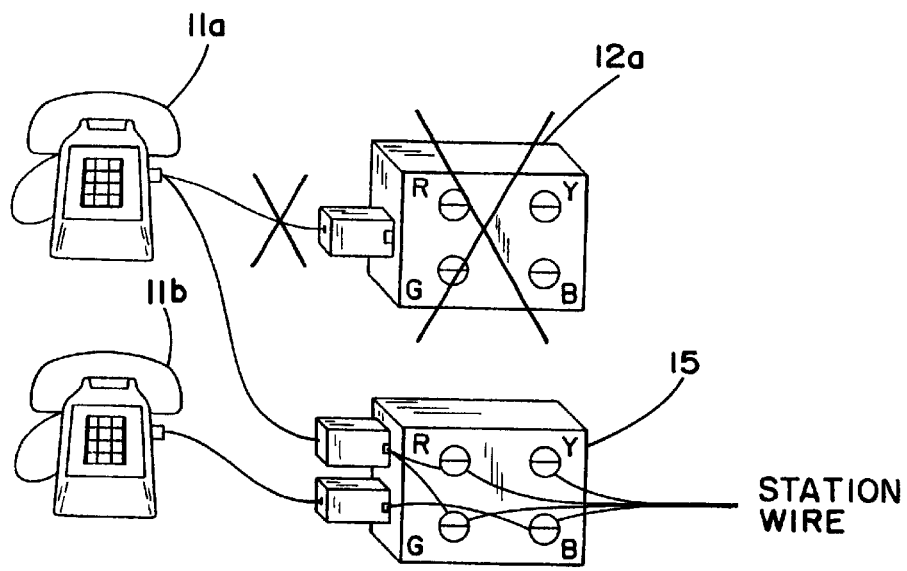
Figure 1D:
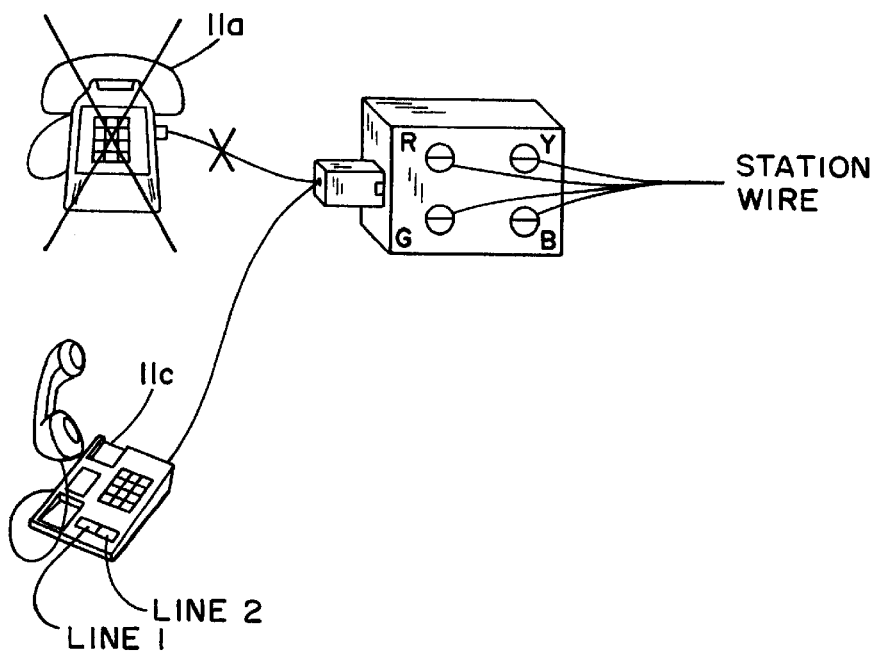
Figure 2:
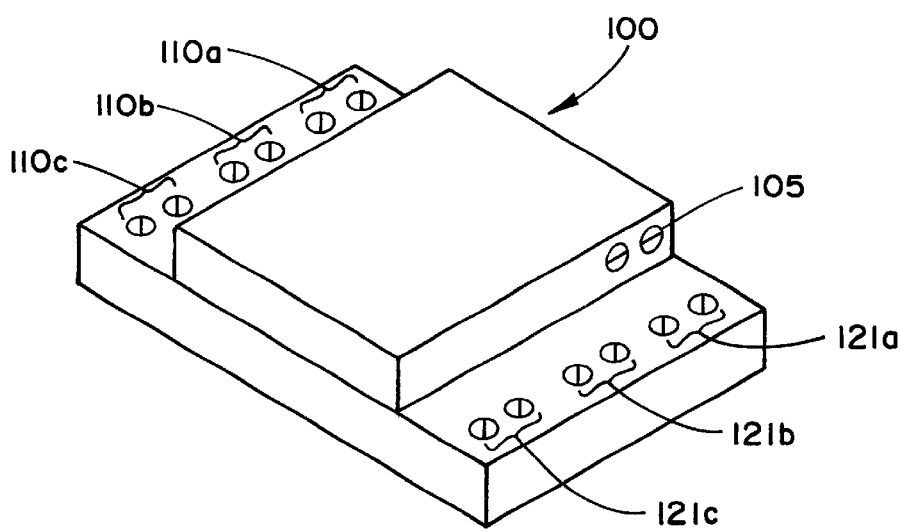
FIG. 2 illustrates a perspective plan view of an interface device enclosed within a housing according to the present invention.

FIG. 2 illustrates a physical view of the multi-line and station interface (MLSI) device 100 of the present invention. As explained above, the multi-line and station interface device 100 ("interface device") includes circuitry (explained in detail below) which is enclosed in high impact housing and which is easily installable in any accessible area adjacent to the present LEC (local exchange company) demarc block which is provided by an existing primary service provider. As shown in FIG. 2 and the functional diagram of FIG. 3, the circuitry for the interface device is powered by an interchangeable power converter module 130 on the circuit board. The selected module 130 is dependent upon two optional power sources. The first option is power available from the service terminating interface (DEMARC) at the service location. The line can be powered from a protected source and can provide 35–60 volt quasi square wave AC to the interface device on terminals 105. The second and preferable option is to have an external power source instead of the internal power module 130 to provide terminals 105 with 24 volt DC from a low voltage transformer connected to any available 110 volt AC source. The interface device may be deployed coincident with cable television and telephony services provided over a HFC cable network.

Figure 3:
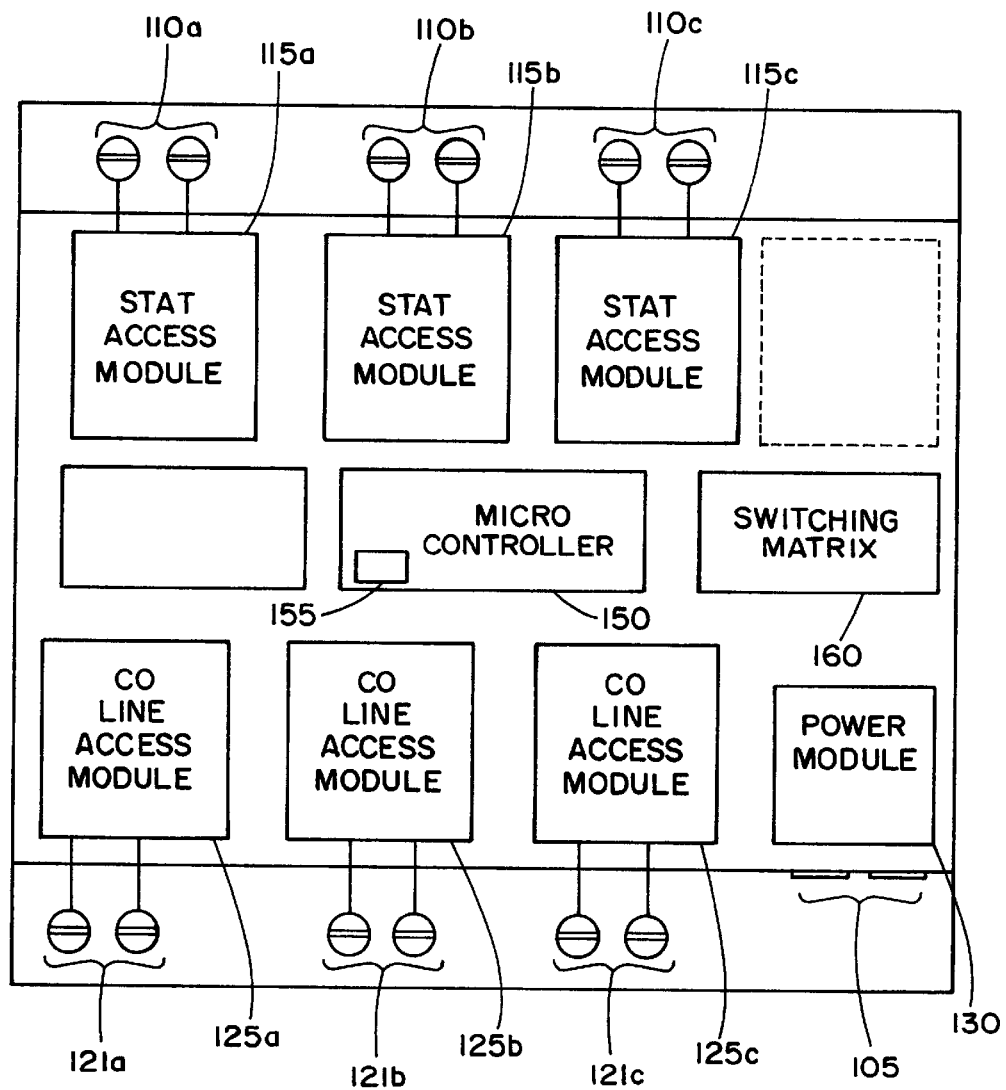
FIG. 3 illustrates a block diagram of a layout of one embodiment of the interface device shown in FIG. 2 according to the present invention.
Figure 4:
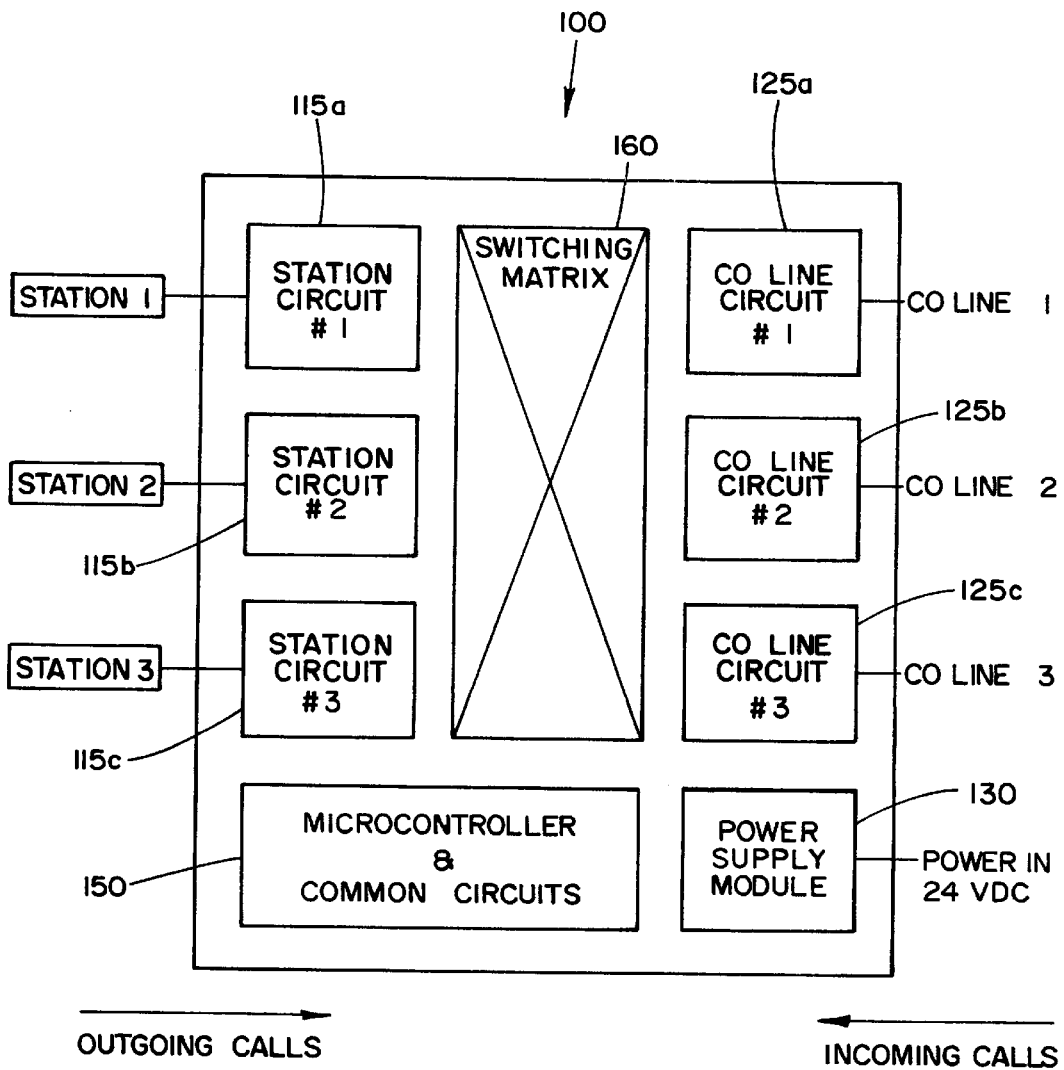
FIG. 4 illustrates a functional block diagram of one embodiment of the interface device shown in FIG. 2 according to the present invention.
Figure 5:
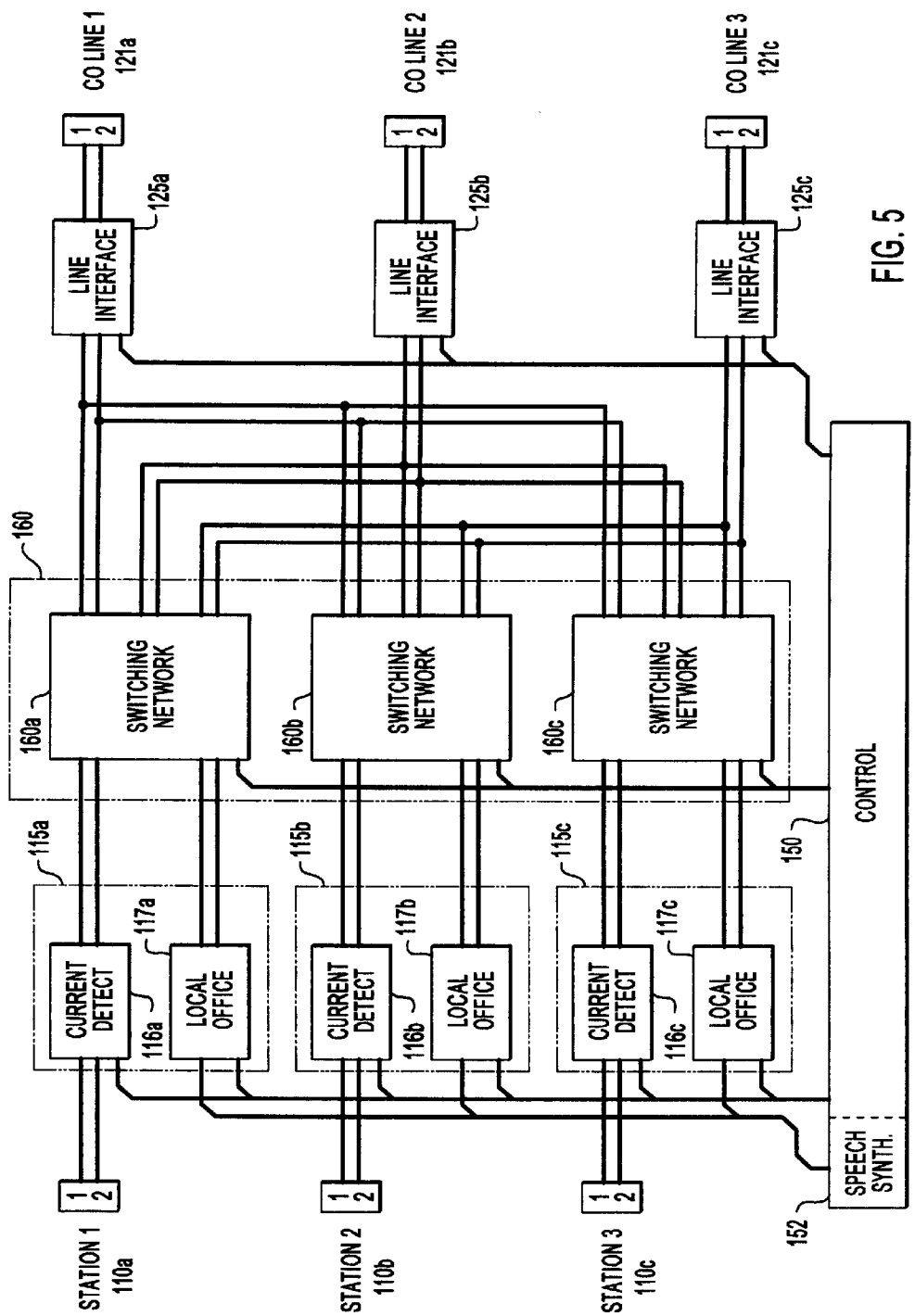
FIG. 5 illustrates a functional block diagram of another embodiment of the interface device shown in FIG. 2 according to the present invention.

To provide the functionality afforded by the multi-line interface device, the existing wiring which serves each telephone station is disconnected from a present demarc for individual connection to respective phone station ports, three of which 110a, 110b, and 110c are indicated at one end of the interface device 100 as shown in FIGS. 2–5. Each of the telephone stations connections 110a, 110b, and 110c are connected to corresponding station access modules 115a, 115b, and 115c which are commercially available devices for processing signals emanating from and input to respective telephone stations 1, 2, and 3 as shown in FIGS. 4–5. Particularly, each station access module 115a–115c includes circuitry that is connected with a local battery feed source for providing proper termination to each respective on-hook station (e.g. telephone). It also provides the means of sending call status signals (for e.g., reorder tone and call waiting tone) when a telephone station is off-hook (i.e., in use). The station access module 115a–115c will be described in detail in connection with FIG. 5.

In one embodiment, the local exchange company ("LEC") demarc may be connected to the interface device 100 at the designated LEC input terminals 121c as shown in FIG. 2, however any service provider central office line may suffice. The one or two central office lines of a secondary service provider are connected to corresponding line input terminals 121a, 121b as indicated in FIG. 2. Each of the line input terminals 121a–121c are connected with corresponding telephone service provider line access modules 125a, 125b, and 125c which are commercially available devices for communicating signals to/from central offices of telephone or alternate service providers As will be described in detail in connection with FIG. 9, each line access module 125a–125c includes balanced loop current detector 127, as well as active and resistive loop hold circuitry 128 to present proper termination towards the LEC central office (CO) line when the line is put on hold or during a remote programming operation. The LEC central office (CO) is a local switching system, such a telephone company, and its associated equipment located in a wire center. A station refers to a single-line or multi-line telephone, a fax machine, a modem or any other in-house terminal equipment. A station line is the wiring which connects the station to the MLSI device 100. More than one station can be connected to the same station line.

As can be seen in FIGS. 2 and 3, all telephone station connections are on one end of the interface device 100 and the incoming lines are on the opposite end, the interface device providing series connections between an individual telephone station and the available central office dial tone lines via a switch matrix and bus 160. As shown in FIG. 5, the switching matrix 160 includes at least one switching network, such as three switching networks 160a, 160b and 160c (160a–160c). Although three switching networks 160a–160c for connecting three CO lines 121a–121c to three stations 110a–110c is shown in FIG. 5, the MLSI 100. However, it is understood by those skilled in the art that any number of CO lines and stations may be interconnected. The MLSI device 100 may also be supplied with two subsystems, where each subsystem interconnects three switching networks 160a–160c to one of three CO lines 121a–121c. Thus, one embodiment of the MLSI device 100 interconnects three CO lines to six stations in a 3×6 array.

Each switching networks 160a–160c of the MLSI device 100 includes a matrix of switches such as miniature mechanical relays or solid state relays, for example. A detailed description of one of the switching networks 160a–160c will be described below in connection with FIG. 7. The switching matrix 160 provides direct switching and bridging of any of the three stations to any of the three CO lines. Instead of a matrix of switches, other devices known in art may be used to implement the switching matrix 160. The telephone stations are no longer bridged together having access to only one C.O. line, but rather each station connection 110a–110c functions as an individual unbridged communications access facility as will be explained in further detail below.

FIG. 5 also shows in greater detail the station access modules 115a–115c, where each station access module includes a current detect circuit 116a and a local office unit 117a. A controller 150 is connected to all the modules of the MLSI 100 for control thereof. In particular, the controller 150 is connected to the current detect circuits 116a–116c and local office units 117a–117c of the station access modules 115a–115c, the switching networks 160a–160c, and the line access or interface modules 125a–125c.

A speech synthesizer 152 is also included in the embodiment of the MLSI device 100 shown in FIG. 5. The speech synthesizer 152 provides an audio signal to any number of the stations 1–3 which are connected to the terminals 121a–121c of the station access modules 115a–115c. The audio signal indicates the status of the interface device 100. Alternatively, or in addition to, the audio signal indicates other features requested by the stations 1–3, such as programming options, commands, call waiting, and message waiting.

The speech synthesizer 152 is connected to the local office units 117a–117c of the station access modules 115a–115c. The control unit 150 selectively connects and provides the audio signals from the speech synthesizer 152 to one or more desired local office units 117a–117c. The speech synthesizer 170 may provide audio signals in one or more languages, such as English and/or Spanish for example, which are selectable by the user. Illustratively, the speech synthesizer 152 is an MSM66P54 integrated chip manufactured by OKI Data.

Tables 1 and 2 include an illustrative list of messages and vocabulary of the speech synthesizer 170, respectively.

TABLE 1

| MESSAGES |
| --- |
| Line 1 Message Waiting |
| Line 2 Message Waiting |
| Line 3 Message Waiting |
| Line 1 on hoid |
| Line 2 on hold |
| Line 3 on hold |
| Line 1 down |
| Line 1 busy |
| Line 1 private |
| Line 1 ringing |
| Hello, this is TCG MLSI, version one |
| Private mode enabled |
| Private mode disabled |
| Bridging enabled |
| Bridging disabled |
| Access order line 1, line 2, line 3 |
| Ring from line 1, line 2, line 3 disabled |
| Rings from all lines enabled |
| Invalid entry |
| Beep |

TABLE 2

| VOCABULARY |
| --- |
| Line 1 |
| Line 2 |
| Line 3 |
| Message waiting |
| On hold |
| Down |
| Busy |
| Private |
| Rinqing |
| Hello, this is TCG MLSI, version one |
| Mode |
| Enabled |
| Disabled |
| Access order |
| Ring from |
| All lines |
| Bridging |
| Invalid entry |
| Beep |

Figure 6:
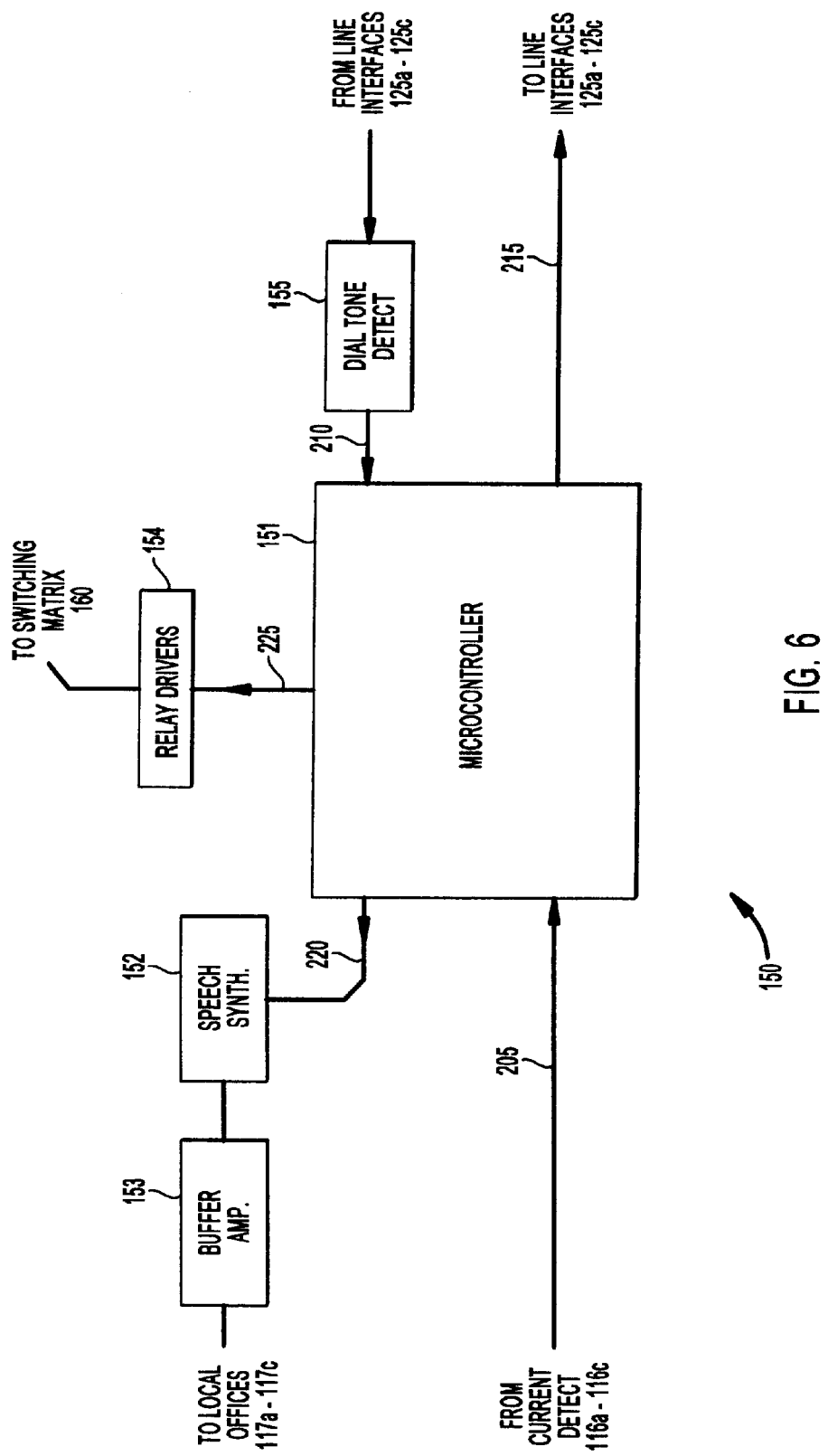
FIG. 6 illustrates a functional block diagram of a control unit of the interface device shown in FIG. 5 according to the present invention.

FIG. 6 shows a block diagram of the control unit 150 which has a micro-controller 151, such as a Motorola MC68HC05C8 micro-controller, which is an integrated circuit computer for executing software instructions to perform the MLSI functions. Illustratively, the software instructions are stored in the MLSI as a permanent part and thus referred to as firmware. The micro-controller 151 has one input 205 from the current detect modules 116a–116c (FIG. 5). Another input 210 of the micro-controller 151 is receives from the line interfaces 125a–125c, through a dial tone detect circuit 155.

Preferably, a single dial tone detect circuit 155 is provided which is connectable to any of the CO lines. However, it is understood by those skilled in the art that additional dial tone detect circuits may be provided so that each CO line is connected to its own dial tone detect circuit, instead of sharing a single dial tone detect circuit. Further, any combination of individual and shared dial tone detect circuits may also be used.

The dial tone detect circuit 155 listens to CO lines 121a–121c and signals the micro-controller 151 when a dial tone is present. The line status or dial tone detector 155 informs the interface device 100 if the respective access or central office (CO) line is alive, i.e., if a line voltage is present. In addition, the dial tone detector 155 identifies a 'call in progress' status by detecting the dial tone.

In addition, the micro-controller 151 has three sets of outputs. A first set of outputs 215 is connected to the line interfaces 125a–125c, and a second set of outputs 220 is connected to the speech synthesizer 152 and a buffer amplifier 153 which in turn is connected to the local office units 117a–117c. The speech synthesizer 152, under the control and direction of the micro-controller 151, converts data patterns stored in a memory of the micro-controller 151 into phrases, such as the phrases listed in Table 2, referred to as the stored vocabulary. The buffer amplifier 153 amplifies the audio signal from the speech synthesizer 152 to a proper level for transmission to the local stations 110a–110c.

The third set of outputs 225 are connected to the switching matrix 160 through relay drivers 154, which are integrated circuits that boost logical signals from the micro-controller 151 to provide sufficient current to drive relays that form the switching networks 160a–160c.

Figure 7:
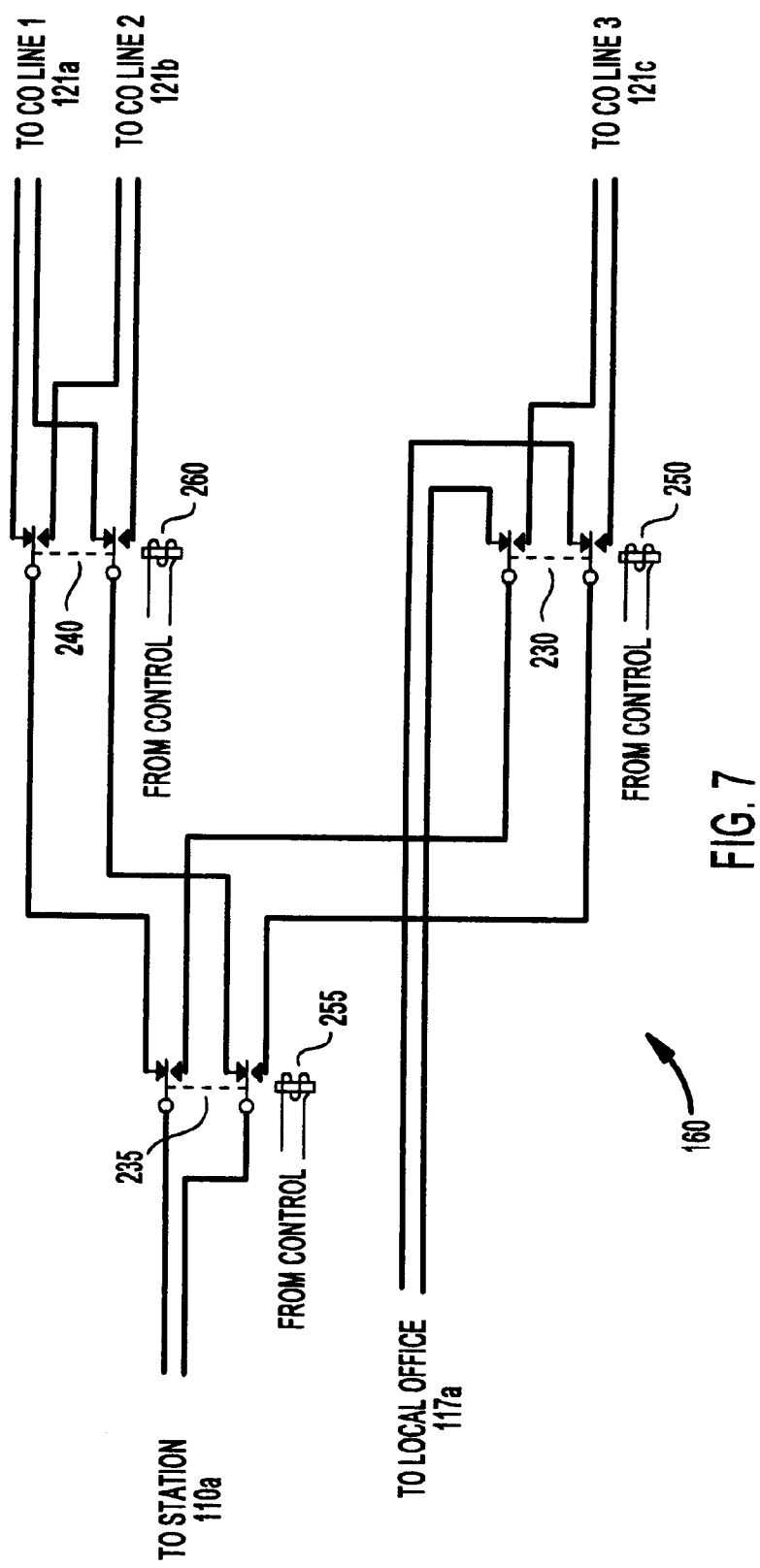
FIG. 7 illustrates a schematic of a switching network of the interface device shown in FIG. 5 according to the present invention.

FIG. 7 shows in greater detail one of the switching networks 160a–160c depicted in FIG. 5. The switching network 160a has three relays 230, 235, 240 each having two armatures that toggles together in response to control signals from the micro-controller 151 through the relay drivers 154 (FIG. 6). The control signals energize solenoids 250, 255, 260 of the respective relays 230, 235, 240 to interconnect the various CO lines 121a–121c to the station lines 110a–110c.

Returning to FIG. 5, the current detect modules 116a–116c of the station access modules 115a–115c determine if the handset of the stations 110a–110c are off hook and alert the micro-controller 151 (FIG. 6) of the control unit 150. The local office units 117a–117c simulate certain functions which the individual stations 110a–110c would normally receive from the central office through the CO lines 121a–121c, such as providing loop current, and detecting and decoding DTMF signals.

Figure 8:
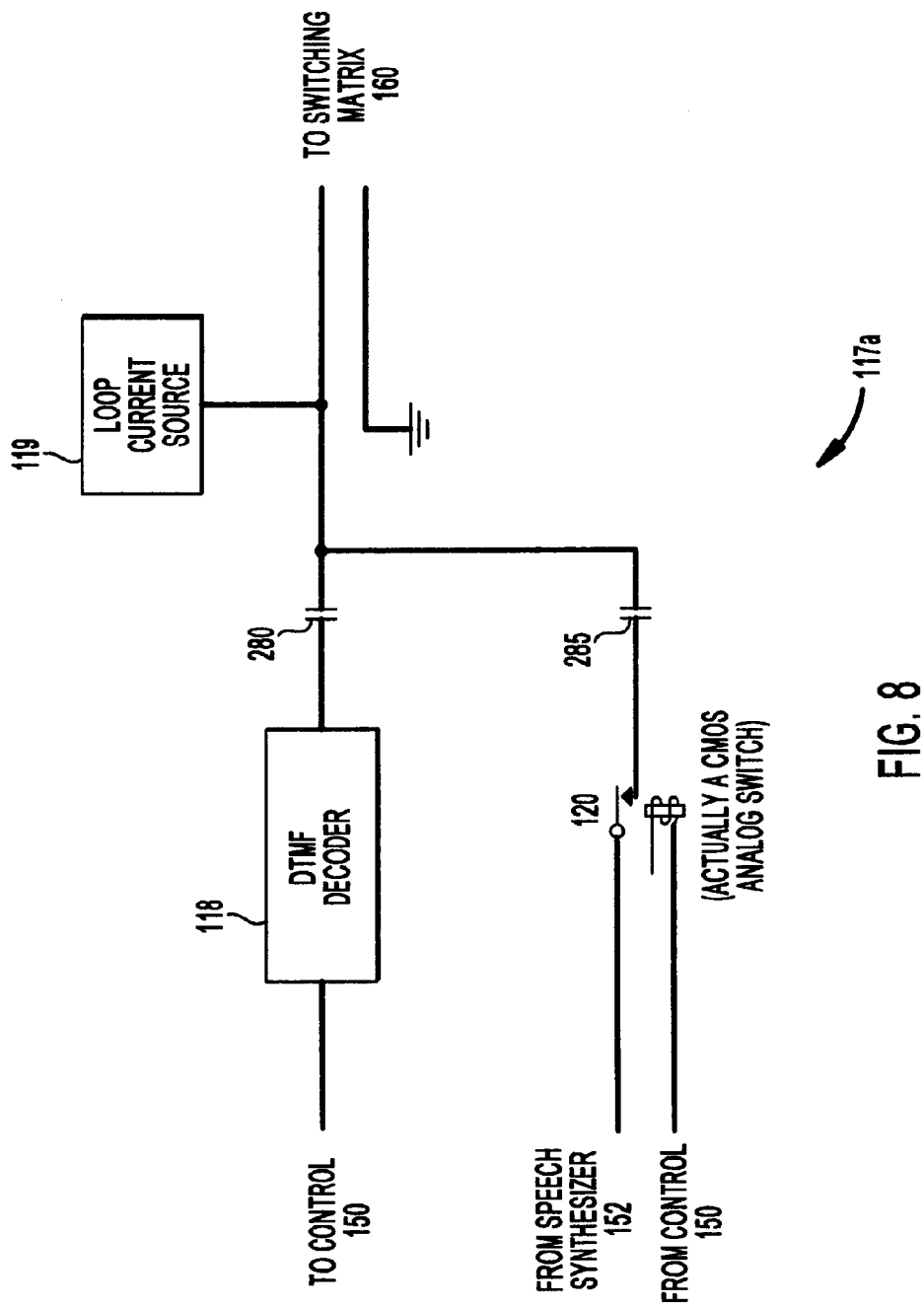
FIG. 8 illustrates a functional block diagram of a local office of the interface device shown in FIG. 5 according to the present invention.

FIG. 8 shows in greater detail one of the local office units 117a–117c of the station access modules 115a–115c depicted in FIG. 5. As shown in FIG. 8, each local office units 117a–117c has a DTMF decoder 118 which detects and decodes the various tones created by pressing dial buttons of the telephone stations 110a–110c, e.g., 1, 2, . . . , 0, *, #, and provides the decoded signals to the control unit 150.

The DTMF decoder 118 is also capacitively coupled to the switching matrix 160 through a capacitor 280. A loop current source 119 is connected to the line connecting the capacitor 280 to the switching matrix 160. The loop current source 119 provides current to operate the telephones 110a–110c. Thus, the telephones 110a–110c operate receive the required operating current from the loop current source 119 instead of from the central office through the CO lines 121a–121c.

Each local office units 117a–117c also includes a relay 120, such as a CMOS based analog switch. The relay 120 is actuated using control signals from the control unit 150 (FIG. 5) provided through the relay drivers 154 (FIG. 6) to selectively connect the buffer amplifier 153 to the switching matrix 160 through a capacitor 285. Through the switching matrix 160, the relay 120 connects or disconnect the local stations 110a–110c to the amplified audio signal form the speech synthesizer 152 as amplified by the buffer amplifier 153 (FIG. 6).

Figure 9:
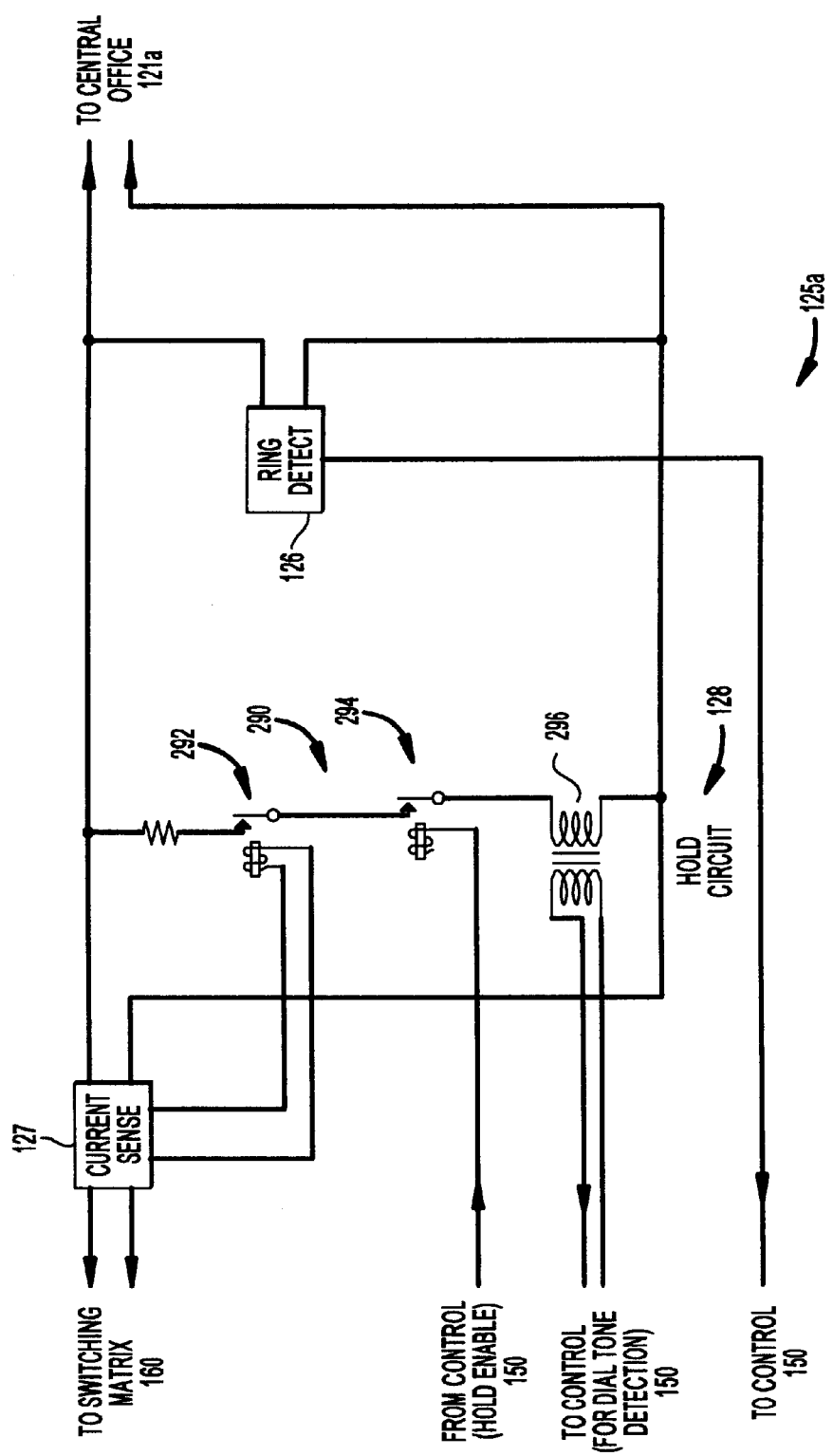
FIG. 9 illustrates a functional block diagram of a line interface of the interface device shown in FIG. 5 according to the present invention.

FIG. 9 shows in greater detail one of the line interface or CO line access modules 125a–125c of the MLSI device shown in FIG. 5. The line interface module provides control and status functions related to the central office lines such as ring detection, hold and dial tone detection.

As shown in FIG. 9, each line interface module has a current sense circuit 127 connected between the switching matrix 160 and a CO line, such as one of the three CO lines 121a–121c, e.g., CO line 121a. The current sense circuit 127 detects when a respective CO line 121a is active. A hold circuit 128 is provided which includes a two stage relay 290, e.g., two switches 292, 294 connected in series. Illustratively, the two switches or relays 292, 294 are a provided as a single solid state device. One switch 292 is controlled by the current sense circuit 127, while the other switch 294 is controlled by the control unit 150 to provide a hold enable signal.

The hold circuit 128 simulates a station being connected to the CO line 121a. When the current sense circuit 127 detects that the CO line 121a is active, then the switch 294 controlled by the hold enable signal from the control unit 150 holds the line from the view point of the CO line 121a. In this hold position, the both switches 292, 294 are energized to hold them closed in order to provide a connection between the two leads of the CO line 121a, through a transformer 296 which detects the dial tone and provides coupling to the dial tone detector 155 (FIG. 6). Thus, the hold circuit 128 is active when the hold enable signal from the control unit 150 is active, i.e., when the current sense 127 does not detect a current being drawn through the switching matrix 160. The hold circuit 128 holds a circuit or access/CO line active when the respective access/CO line is put on hold by providing a path for the line current.

A ring detect circuit 126 is also provided between the two leads of the CO line 121a. The ring detect circuit 126 detects that the CO line 121a is sending a ring current. In addition, the ring detect circuit 126 converts the ring current to a digital logic signal and provides this digital logic signal to the control unit 150. For example, the ring detector 126 includes filters and isolators, which may be optical isolators that pass a main signal while holding off ground currents and other extraneous signals. Further, the optical isolators provide the required isolation between the control unit and the CO lines. The ring detector 126 detects an incoming ring from the respective access or CO line.

The line interfaces 125a–125c (FIG. 5 and the dial tone detect circuit 155 (FIG. 6) collectively are referred to as a control circuit which provides control functions as described below. The control circuit 125a–125c, 155 prevents certain control signals from the stations from reaching the respective access line, while the respective access line is connected to those stations. In addition, the control circuit 125a–125c, 155 detects the dial tone on the respective access/CO line.

The control circuit 125a–125c, 155 allows control of the multi-line station interface (MLSI) device 100 using the simplest standard telephone handset which has twelve push-buttons that produce standard dial tone multi-frequency (DTMF) signals, for example, and an on-hook/off-hook key, without requiring an extended handset that has additional controls such as mute, hold and flash keys.

Without the control circuit 125a–125c, 155, the interface device cannot distinguish between DTMF signals indicating dialing, or indicating MLSI control functions, such as tone menu/voice mail selection, for example. The control circuit 125a–125c, 155, with the aid of the switching matrix 160 distinguishes between DTMF signals to be propagated to the CO line 121a–121c and MLSI control DTMF signals which are prevented from reaching the CO line 121a–121c. Otherwise, if an MLSI control DTMF signal is propagated to the CO lines 121a–121c, then dialing options may be changed, even in disconnection. In particular, when a station 110a is connected to a local office 117a, then DTMF signals are recognized as being control signals and are prevented from propagating to the CO lines. However, when a station is connected to a CO line, then DTMF signals from the station are propagated through the MLSI to the CO line connected to the station which generated the DTMF signals.

To distinguish between MLSI control DTMF signals and DTMF dialing signals intended for propagation to the CO lines 121a–121c, an additional signal is used such as a prefix or escape sequence to identify any following DTMF tones as MLSI control DTMF signals. Illustratively, a 'Flash' signal is used as the identifying signal or the escape sequence. The 'Flash' signal is provided upon depressing a Flash key on telephones equipped with one, or by a quickly clicking the on/off key to provide a short on-hook/off-hook cycle. However, since the Flash signal already has a specific standard CO function of switching between a waiting line or call and an on-going call, the control circuit 125a–125c, 155, blocks transmission of the first Flash into the CO line. Instead, the first Flash signal serves as an escape sequence to mean 'attention' for the MLSI device 100. Except for a second Flash signal, signals shortly (e.g., within 1.5 seconds) following the first Flash signal are MLSI control signals and are prevented from propagation to the CO lines. A second Flash is propagated to the CO line for performing its standard function, such as the switching between waiting and on-going calls. This provides a simple and user friendly solution to identifying the MLSI control signals and preventing their transmission to the CO lines.

Illustratively, if one wants to switch to CO 121a, then the 'Flash' and '1' keys are depressed or dialed. To switch to a waiting line, than the 'Flash' key is depressed twice. The second Flash signal is transmitted to the CO line. The Flash and one or more number keys in sequence are also used to program the MLSI, such as to turn on/off internal waiting signals, bridging and other feature as described. The speech synthesizer 170 is used to provide audio signal to the user of stations or telephones to help in programming as well as identifying status and available options of the MLSI device 100.

The following is an illustrative list of control and programming functions of the MLSI device 100, along with a description thereof. As described above, the Flash signal serves as an escape sequence. After pushing the Flash button on a telephone, the Flash event may continue for some time after the release of the Flash button. Preferably, the MLSI device 100 provides an acknowledge signal, such as a double beep, indicating that the Flash event is over. After the end of the Flash event, further buttons may be pushed to control the MLSI device 100 as follows:

1. To switch to call waiting on the same CO line: The MLSI supports the call waiting feature. To switch between calls, use Flash+W(9) (W for "Waiting"). This command sequence produces a "Flash" condition on the CO line. Some telephone stations may required Flash for special functions.
2. To switch to another CO line: While disconnecting (putting on-hook) the current CO line Press "Flash", then the number of CO line you want to connect to (Flash+1, Flash+2, Flash+3). The CO line that was connected before the switch will be put on-hook unless another station is connected to it.
3. To put the line on hold: To put the current CO line on hold, dial Flash+H(4) ('H' for "Hold"). If you want to switch to another CO line, dial the number of that CO line. For example, Flash+H+2 will put the current CO line on hold and switch you to CO line 2. If no dial was entered after H, then in 3 seconds the MLSI will automatically switch the station to the next available CO line according to access order. You can also hang up; the CO line will be kept on hold for three minutes. Then you can go to another station and switch to the holding CO line. Notice: One should understand the difference between the MLSI hold condition that is set by the Flash+H command the and stations' hold condition which can be set by the push-button "Hold" on the telephone. The MLSI "Hold" puts the CO line on hold and disconnects the station from the CO line. One can initiate another call from this station, or hang up and go to another station and pick up the connection. The push-button "Hold" puts the station and connected CO line on hold. This condition can last indefinitely.
4. To enable/disable Private Mode: Flash+P(7) enables private mode, Flash+U(8) ('U' for "Unrestricted access or Undo") disables it.
5. To disable/enable Bridging: Flash+N(6) ('N' for "No interference, no disturbance") disables bridging conference, Flash+U enables it.
6. To interrupt any message: dial '#'.
7. CO line identification: Flash+#. The message identifies the CO line connected to the station.
8. Access Order: Dial Flash+*+A(2)+1+2+3+#. This sequence sets the following access order: CO1, CO2, CO3. The first digit A(2) means command code; the others constitute an access order list. To exclude a CO from the automatic access, just skip its number. The command Flash+*+A+3+2+# sets an access order with CO3 first, then CO2 and never CO1. To listen to an access order report, dial Flash+*+A+#.
9. Incoming Ring Settings: Dial Flash+*+R(7)+1+2+3+#. This sequence determines when the incoming rings from all COs will be transferred to this station. The first digit R(7) means command code; the others correspond to the COs whose rings are to be transferred. To exclude a CO from ringing, just skip its number. The command Flash+*+R+1+3+# leaves out CO2. To listen ro the ringing settings report, dial Flash+*+R+#.
10. MLSI Status Report: Dial Flash+*+V (8)+# to listen MLSI Version and Status Report. Notice: The sequence "Flash+*" Notice: The sequence"Flash+*" disconnects the station from CO lines. To restore a connection just put the station on-hook.

11. Message Waiting: The MLSI supports the message waiting feature. When any station goes off-hook, the MLSI produces a message identifying all COs that have a message waiting. The MLSI polls all the CO lines every 15 minutes looking for interrupted dial tones. If you have connected to a CO line that has a message waiting (interrupted dial tone), then this CO line will not be reported as having the message waiting condition until the next polling, even if the message(s) have not been retrieved (The interrupted dial tone will be present on this CO line when it goes off-hook until the message(s) are retrieved).

12. Caller ID: The MLSI supports the Caller ID feature. The telephone stations connected to the MLSI must have a capability to recognize Caller ID code sequences immediately; otherwise, if several calls (rings from the different COs) come simultaneously, only the first caller ID would be valid.

Audio signals, such as speech and/or tone, which are provided by the speech synthesizer 170 include internal (line busy) and external (CO down) busy signals and an internal line waiting signal. Illustratively, the line busy signal is a tone of 0.5 seconds on and 0.5 second off, while the CO down tone is 0.2 seconds on and 0.3 seconds off. The line busy signal is produced by the speech synthesizer 170 when the station goes off because all available CO lines have calls in progress. This occurs when the number of CO lines, which is three in the illustrative examples shown in the Figures, is less than the number of stations.

Alternatively, the line busy signal is generated when some of the CO lines have been placed on hold by another station. The line busy signal is also generated when a user is attempting to bridge to a station having a call in progress in a 'private' mode, where bridging is not allowed. The CO down busy signal is provided to a station when the user is trying to connect the station to a CO line which is down or not connected to the MLSI device 100.

Bridging allows two or more stations to be connected to the same CO access line. Bridging is performed by switching one or more stations to the CO line that has a call in progress and connecting to the one or more stations to the station which is already connected to the CO line and has the call in progress. If the user on the station having the call in progress does not want anybody to interfere, the user enters a bridging disable command to enter the private mode.

In the private mode, any other station trying to bridge into the 'private' call in progress is notified, e.g., via tones or a speech message, that such a connection is not possible. For example, the speech synthesizer 170 provides a message to the attempting station(s) a message such as 'line private'.

To enable bridging, the user of the call in progress station executes an 'unrestricted access' command; otherwise bridging to the call in progress station is disabled for both incoming and outgoing calls, including 'waiting call' messages about other lines. The 'bridging enabled/disabled' condition is related to the station line, not to the CO line. Thus, if a certain station is in the private mode, then any connection from this station is private.

For example, if station 1 is in the private mode and connected to the CO2 line, then no other station be bridged to the CO2 line and no messages about incoming rings on the CO1 and CO3 lines will be produced to station 1. If CO2 is then put on hold, and station 1 is switched to the CO3 line, then the CO3 connection becomes private and other stations can switch to the CO2 line. The private mode can be enabled/disabled during a call in progress. If two or more stations are bridged to the same initial CO line, and one of stations sets the private mode, the other stations will not be disconnected. However, if the other stations switch to another CO line, then these switched stations will not be able to reconnect to the initial CO line for as long as the initial CO line is connected to a station set in the private mode.

If the station is set to the private mode, bridging thereto by other stations, and messages about incoming rings from other CO lines, are disabled. For example, the private mode is useful for data transfers or when the user does not want to be interrupted. To disable CO 'waiting call' tones, it is not necessary to set the private mode. Rather, a special prefix is added to the telephone number as provided by the CO.

Incoming ring settings are also programmable. When the CO line has an incoming ring, all on hook stations receive this ring. However, there are situations where the user does not want the station to react to an incoming ring form certain COs. For example, consider a case where a telefax machine is connected to Station line 3 and the telephone number received from CO3 is predetermined as a fax number. If CO3 is ringing, this ring is accepted by station line 3 only. This option is set through a 'ring setting' command. Stations 1 and 2 are programmed to accept rings from both CO1 and CO2, and station 3 is programmed to accept a ring from CO3 only. In this example, station 3 can still use any available CO line to send a fax, even though it will only receive a fax on CO3.

The internal line waiting signal is provided to off-hook stations when one or more on-hook stations are receiving an incoming call. Different distinctive signals are used to identify the different ringing COs, for example. The internal line waiting signal is also generated when the user has placed one or more COs on hold and connected to another CO from the same station. The distinctive signals or speech signals from the speech generator will remind the user of the hold status and identify the holding CO line. In addition, the MLSI device 10 produces an interrupted dial tone to any station that goes off hook, if the message waiting signal has been detected at any CO line. The internal signaling may be disabled separately for every station by a corresponding control sequence.

As shown in FIG. 5, each of the station access modules 115a–115c comprises a signal generator 196 for generating a busy/line waiting signal for internal signaling to the stations to indicate that a desired access line is busy or a line is on hold as describe above. Further, each of the station access modules 115a–115c includes a dialing detector 192, such as a DTMF detector, for receiving and decoding the dialing signals from the stations in order to perform the user interface functions described above.

Each of the station access modules 115a–115c also comprises a line status detector 194, which includes a current sensing circuit, and a local current source 196. The current sensing circuit of the line status detector 194 detects the on-hook/off-hook status of the respective station line, i.e., determines if a telephone set is off or on hook (picked up or not). The local current source 196 provides to the respective station a line current when the respective station is off-hook. The current provided by the local current source 196 runs the telephone set when it is not yet connected to an external (central office) phone line. This current is needed when the local phone is being used to program options in the MLSI, for example.

The MLSI device 100 detects the off-hook event at any station line before the MLSI device 100 makes a decision about which CO line the off-hook station has to be connected to. The local current source 196 provides the necessary current, even when a station goes off-hook while none of the CO lines are available. Thus, the local current source 196 powers the internal station circuitry including the station DTMF generator, which is needed to produce the user control signals described above.

The control unit 150, which includes a microprocessor for example, manages all MLSI functions and collects data from the line detectors 194 and controls the switching network 160 to provide the required connections. The control unit 150 provides connection of telephones or stations to CO lines in accordance with a programmable access order. Each station has its own programmable access order. When any station goes off-hook, the MLSI connects the off-hook station to the CO line which is first on the access order list. If this first CO line is not available, e.g., busy or down, then the MLSI connects the off-hook station to the next CO line on the access order list.

The access order is programmed for all stations collectively or each station individually. The access order may be set to leave out certain CO lines, so the MLSI will never provide automatic connection from a station to a CO line which is left out of the access order. If none of the CO lines listed in the access order for a given station are available, then the user gets a speech message from the speech synthesizer 170, for example, such as 'all lines busy'. However, this restriction is applicable to the automatic switching only. One can always switch to the excluded CO lines using manual control commands if a line in known to be free.

Outgoing Calls

The interface device 100 serves as a buffer to each telephone station waiting for a request by a telephone station to make an outside call. As shown in FIGS. 4–5, when a request to make a call is made, for e.g., by a telephone, PC or FAX modem labeled station 1, the telephone goes "off-hook" and a circuit is completed from the station 1 to its corresponding station access module 115a. Circuitry in the station access module 115a senses the closed circuit established by the telephone being off-hook and consequently sends a command signal to a micro-controller 150.

In accordance with the access order, the micro-controller 150 polls each line access module 125a–125c to determine which central office line is available and commands the switching matrix 160 to open up the station module connection with the common bus on the circuit board for connection to the first available line access module. Additional line choices are made from the preprogrammed sequence or access order. This results in the station receiving a dial tone from the first available CO line of the service provider in the access order for the call initiating station. The control unit 150 controls the switching network to connect one line access module to the call initiating station, which is connected to one station access module, before dialing begins from the call initiating station.

Illustratively, when the access order of the call initiating station is CO line 1, CO line 2, and CO line 3, if CO line 1 is available, then the call initiating station will be connected to CO line 1. If CO line 1 is busy, then the call initiating station is connected CO line 2 if available. If all the access lines in the access order list for the call initiating station are busy, then a tone or speech message from the speech synthesizer 170, such as 'all line busy' is provided to the call initiating station.

Despite this 'all line busy' message, the call initiating station may be manually switched to access lines that are not in the access order list for this particular station. Further, one can also bridge onto any station line that has a call in progress and is not in the private or bridging-disabled mode.

To switch explicitly to a certain CO line, a station is placed off-hook, the 'Flash' key is pressed (or the on/off hook key quickly depressed), followed by the number of the CO line, e.g., CO2. This connects the station to the specified CO line, i.e., CO line 2. If the selected CO line (CO line 2) is connected to another station, one will bridge onto this connection, unless the mode is 'private'. If the desired CO line is connected to a station which is in a private or bridging-disabled mode, then one well get a tone or message indicative of the private mode, such as 'line private'. If one switches to a CO line that does not have a dial tone, or is not connected to the MLSI, one will get a corresponding tone or message, such as 'line down'.

Upon connection to a CO access line and obtaining a dial tone, a customer using the telephone may then proceed to dial the requested number with all line connections remaining in this state until the call is terminated. Upon hang-up, the telephone receiver is "on-hook" and the micro-controller commands the connection switching matrix 160 to open up the bridge between station access module 115a and the line access module. The station access module is restored across the common station bus and the line access module is restored to an idle status open to receive new status commands.

Incoming Calls

An incoming phone call from a service provider's central office switch will provide ringing current across respective terminals 121a, 121b, and, 121c of the corresponding CO line access module 125a, 125b, and 125c. The ringing voltage is detected by the receiving line access module which then sends a signal to the micro-controller 150 which polls each station access module 121a–121c to determine the status of each. A station that is off-hook with a call in progress through another line module will respond its condition. The micro-controller then proceeds to send a command to the switching matrix 160 to connect the ringing line access module to the common bus and the stations (station access modules) that are in an on-hook idle status are bridged to the common bus. Thus, all on-hook stations, except for those programmed not to accept a ring from the calling CO line, receive the ringing current and associated ringing current circuitry for the particular station will present a functional signal.

Under command from the micro-controller, suitable tone generator circuitry, or the speech synthesizer 170, will simultaneously generate an audible "beep", or speech message (such as 'line one ringing'), that is optionally delivered to any off-hook stations having a call in progress and is not in the private mode. This audible beep tone is somewhat similar to the conventional call waiting beep tone that is presented to a station when call waiting service is available, however, the tone generated from the interface device may vary in duration or frequency from the tone provided by the service company provider. To distinguish the source of the incoming call, the interface device generated call waiting beep tone may include dual beeps for calls incoming on central office lines 1 and 2, and, a single beep for calls incoming on central office line 3. The beep tone is distinguishable from the LEC call waiting tone, which is shunted through on a connected line from the CO, in the event a third party calls the LEC line number while that line is in use.

Call Waiting

It is understood that the interface device 100 establishes the connection of the incoming call to first station to pick up, and all other stations are clear to either make or receive calls. A station having a call in progress may flash the switch hook to signal its respective station access module that it desires to answer the incoming call on another line. A signal is thus delivered to the micro-controller 150 to identify which line has the call waiting and the correct bus bridging is initiated to that station module. Concurrently, the original call is held by the line access module circuitry. Subsequent flash hook signals at the station having a call in progress will alternate station connection to either call, the interface device thus performing the call waiting feature across multiple service lines.

Thus, in the case of simultaneous incoming rings on two or more CO lines, the first detected ring is transferred to all available on-hook stations that are set to receive this ring. The ringing station is taken off-hook and is automatically connected to the ringing CO line on a first come-first serve basis, for example. The ringing station also receives a message about the other ringing stations. The other available station are connected to the other ringing COs and continue ringing until someone picks up the ringing station. All off-hook stations except those in the private mode receive messages about all ringing lines. Picking up the phone on a ringing line connects the station to the ringing line.

In the preferred embodiment, the first phone of the premises to request a call completion will control the micro-controller chip 150. Additionally, the micro-controller 150 may be programmed so that any station going off-hook can access any connected central office line in a priority based sequence, for e.g., sequential order. Once the call is routed and connected to the selected dial tone line via the switching matrix bus, the functions of the interface device are available to any other telephone station requesting completion of an out bound call. The same functions may be performed for that call, and the call is routed to the appropriate selection choice.

For example, as shown in FIG. 4, a call may be established between telephone station 1 (station access module 115a) that is switch connected to line access module 125a and finally to the service provider's C.O. switch. A second telephone station 2 or 3 may bridge onto that call. In the manner described above, a station, for e.g., station 3, that goes off-hook will signal the micro-controller to select an idle line to effect a call. The micro-controller receives the request and verifies the next sequential idle line access module, e.g., 125b, for connection thereto. Thus, a dial tone will be received by telephone station 3.

If the customer at station 3 does not wish to establish a new phone call, the switch hook contacts may be flashed and the station access module will recognize the interruption and send a signal to the micro-controller to command the switching matrix to remove the established line connection (bridge) between the station 3 and line access module 125b. The micro-controller then determines which line modules have a call in progress and proceeds to command the switching matrix to bridge station access module 115c for station 3 to the line access module 125a. If it is the case that the next sequential call module in effect is not the desired bridge, the customer may execute a second switch hook flash commanding the micro-controller to execute a rollover to the third line connection.

If a customer is using a PC or FAX modem that is connected to a telephone station, the call waiting feature may be disabled for all calls to that station or, as desired, for any other selected phone stations. Thus, the micro-controller 150 has the optional programmable feature of passing or blocking any beep tone signals to any station access module 115a–115c. Alternately, the call waiting feature may be disabled on a per call basis.

To prevent generation of certain signals, such as the call waiting signal, the CO must be programmed not to generate these signals. Further, the MLSI can be programmed by the user not to generate such signals locally. For example, the user can program the MLSI to prevent generation of special tones, e.g., call waiting tones, yet pass tones coming from the CO lines to a connected instrument. The passing or preventing local generation of signals is performed by the MLSI without the need for audio or speech recognition. To activate this feature, e.g., to suppress or disable call waiting tones, preset digits may be dialed before the actual number being called. This input of preset digits to the interface device will disable the call waiting tones. Use of the LEC class call waiting disable digits *70 will simultaneously disable call waiting at the MLSI level and at the CO level if allowed by the CO.

Power Failure

In the event of a power failure in the home resulting in a loss of power to the interface device, one or any selected number of telephone stations, including all the telephones, will be connected directly to a preset line, e.g., line 2, for both incoming or outgoing calls. The preset line or default power failure connection is configurable or programmable to be any of the CO lines. If an intermittent power loss at the power module terminals 105 of less than one second are detected, no calls in progress will be affected as the capacitive/inductive circuitry provided to the micro-controller circuitry will sustain power. A power loss at the power module terminals 105 of durations greater than one second will draw power from the established line connection to maintain continuity between any station and any line connection. The bus bridging points in the station modules and the line modules will receive their power from the station line source as long as the circuit remains established. Upon disconnect, the specific line bridging assembly in each line or station module returns to its idle state.

If power is not restored at power terminals 105 after a loss of power at the power module, the interface device is placed in a default condition wherein common bus bridging points in the station access modules return to their idle state. In this embodiment, the idle state establishes a bridge between all of the station access modules for direct connection to station access module 125a enabling both outgoing and incoming calls to/from the central office of service provider 1. The interface device will remain in this state until power is restored and detected by the micro-controller 150.

As mentioned above, when a station is going off-hook to initiate an outgoing call, the micro-controller selects the line connection in sequential order, e.g., line access module 125a, first; line module 125b, second; and line access module 125c, third. In the event battery is not detected in the line module, it will deliver a failure state signal to the micro-controller. The micro-controller will select the next idle module and establish the call through it. Failure of the second selection will default to the third sequential choice line module.

If no service provider is connected to a line access module, the line access module can be locally or remotely programmed as inactive. Specifically, a command may be generated that blocks the particular line access module from all logic decisions for that unit in the microprocessor. Programming of the micro-controller of this feature is accomplished locally by connecting any standard dial tone multi-frequency (DTMF) to the particular station terminal and keying in the programming code, or, is accomplished remotely by dialing into the interface device and executing the proper code sequence.

Other custom local area signaling service (CLASS) functions (e.g., caller I.D., call forwarding, call message waiting, etc.) that the customer subscribes to will be available to any telephone station answering the incoming call. For example, the interface device will support call message waiting service that is currently available to a customer by either service provider, and will detect the "stuttered" dial tone indication that a message has been received by the service provider. When the interface device detects a stuttered tone, it will, in turn, provide a stuttered dial tone to any station going off hook.

The MLSI device 100 provides simultaneous connections between any available central offices lines, such as any of the three CO line CO1, CO2, CO3, and any available stations, such as the three internal home lines with telephone stations (ST1, ST2, ST3). Thus, three telephone stations can be simultaneously connected to different CO lines, for example. While three CO line and three station lines have been described for illustrative purposes, it is understood that the number of telephone stations and CO lines may be any number. For example, the number of station may be bigger than the number of lines if several station are connected to one line in parallel. This condition does not affect the functionality of the MLSI device. The present invention enables any number of stations to be bridged to any number of other stations or any number of access lines, and conversely, any number of access lines may be connected to any number of stations. The line access modules may be connected to access lines of local and long distance telephone central offices, multiple system operators, or a hybrid fiber coax.

The MLSI device 100 also provides internal bridging of telephone stations to any line(s) within the premises and in any order. Private modes allows single station-to-single line connection for private and uninterrupted service, such as for data communication between personal computers, telefaxing, and Internet connection. Incoming rings may be provided to any number or all the stations for any number of lines, having distinctive tone for identifying the respective CO lines.

The MLSI device provides programmable DIRECT line switching and DIRECT connection in any programmable order and between any number of the CO lines and any number of the telephone stations connected thereto, which may be any desired number. Thus, the connection media between the COs and telephone stations includes only wires and linear switches, for example, without the need for transformers, boosters and filters.

The DIRECT connection provides several advantages, such as: very small signal losses and line mismatching; and direct transmission of incoming ring signals, dispensing with the need for the MLSI device to generate rings. This is particular important in view of strict requirements of the power supply of the MLSI device, allowing use of smaller power supplies. Other advantage of providing DIRECT connections includes availability of all local exchange company (LEC) and CLASS functions (e.g., caller I.D., call forwarding, call message waiting), as well as power down/ failure mode of operation, where a pre-set selection of which 1 or all stations are connected to a specific incoming line. Further, due to the DIRECT connections, the MLSI device does not have to generate a dial tone.

The MLSI unbridges all telephones in a premise, allowing each telephone set to connect to any incoming call or outgoing line. Illustratively, the MLSI has screw type connections for three CO lines, and screw type connections for three, or more, stations. A low voltage, e.g., 24 VDC, powers the MLSI from a backup power supply, or from a low voltage transformer connected to any available 110 volt AC source. The MLSI is housed in a compact high impact resistant plastic housing for consumer installation, for example.

Ringing tones within the premises of the multiple stations is differentiated by distinct ringing for each individual CO line. In the event of a power failure, and thereby loss of power to the MLSI device, all stations are connected directly to one of the CO lines for example, for both incoming and outgoing calls. To prevent loss of data in case of a power failure, the MLSI device includes non-volatile memory which retains and holds all programming data contained within the MLSI device until power is restored.

A line waiting notice is provided when a user is on any one of the CO lines, and another CO line rings. The MLSI device notifies the user with a speech message or a tone of one, two or more beeps, for example. The single or double beep indicates which CO line the call is arriving from, for example. The beeps or speech messages would be repeated at a regular interval, e.g., every eight seconds, if the call is not answered. One would use a typical switchhook flash to place the current call on hold, and answer the incoming call. The speech messages are provided by the speech synthesizer, which also provides speech messages indicative of available features and options of the MLSI device and the access lines.

Disabling line waiting on a per call basis is also provided. If the user chooses not to disable line waiting for all calls, it can be disabled on a per call basis. For example, a 'Flash' followed by a particular number(s) is dialed before the actual number being called, and this input to the MLSI device will disable the line waiting tones.

The MLSI device also has the capability to detect message waiting, by going off-hook at predetermined (selectable) intervals, and sensing whether or not any connected CO line has a special (or stuttered) dial tone on the incoming line. If this special tone exists, when the residency goes off hook the next time, the MLSI device will provide that special (or stuttered) dial tone to the customer to enable them to know that a message is waiting.

The MLSI accommodate DTMF (Dual Tone Multi Frequency) on any CO line. For example, the MLSI may be programmed so that if a DTMF signal dialing is detected, a DTMF signal is used for all outgoing calls originated. DTMF dialing can be assigned to any of the given CO lines connected to the multi-line & station interface.

A rotary phone cannot program the MLSI but can answer an incoming call when the rotary phone is ringing. In addition, once connected to the phone line, rotary pulses are transmitted through the MLSI to distant equipment. However, it is understood by those skilled in the art, that modification to the MLSI in accordance with conventional methods and devices would allow the MLSI to accommodate a rotary out-pulse dialing on any CO line and perform identical functions as a DTMF dialing tone. This is achieved, for example, by having a DTMF generator which converts rotary pulses to DTMF pulses. Thus, if rotary dialing is detected, then an equivalent DTMF signal is used to out-dial to any selected CO line, or any choice of DTMF or rotary dialing can be assigned to any of the given CO lines connected to the multi-line & station interface (MLSI).

While the invention has been particularly shown and described with respect to the preferred embodiments thereof, it will be understood by those skilled in the art that the foregoing and other changes in form and details may be made therein without departing from the spirit and scope of the invention, which should be limited only by the scope of the appended claims.

What is claimed:

1. An interface device to enable simultaneous connection of a plurality of access lines to a plurality of stations comprising:
   a plurality of line access modules each connected to a respective one of said plurality of access lines;
   a plurality of station access modules each connected to a respective one of said plurality of stations;
   a switching network for selectively connecting at least one of said plurality of line access modules to at least one of said plurality of station access modules;
   a control unit for controlling said switching network in accordance with one of a predetermined sequence stored in said control unit and selected signals received from said plurality of stations through said plurality of station access modules; and
   a speech synthesizer for providing an audio signal to said plurality of stations indicating status of said interface device.

2. The interface device of claim 1, wherein said plurality of station access modules include at least three station access modules for connecting at least three stations of said plurality of stations to one or more of said plurality of access lines.

3. The interface device of claim 1, wherein said plurality of access lines are connected to local and long distance telephone central offices, multiple system operators and a hybrid fiber coax.

4. The interface device of claim 1, wherein said speech synthesizer further indicates available features and options of said interface device and said access lines.

5. The interface device of claim 1, wherein said control unit connects a number of said plurality of station access modules to a single one of said plurality of access line modules for internal bridging of a number said plurality of stations which are connected to said number of said plurality of station access modules.

6. The interface device of claim 1, wherein said control unit connects said plurality of station access modules to a single one of said access lines.

7. The interface device of claim 1, wherein said control unit connects one of said plurality of station access modules to a single one of said access lines to provide a private connection, said control unit preventing further connections and interruptions of said private connection.

8. The interface device of claim 1, wherein said control unit provides ringing of selected ones of said plurality of stations in response to a ring signal from one or more of said plurality of access lines.

9. The interface device of claim 1, wherein, in response to a ring signal from one of said plurality of access lines, said control unit provides a ringing tone to said plurality of stations which have no calls in progress and optionally provides a line waiting tone to said plurality of stations which have calls in progress.

10. The interface device of claim 1, wherein, in response to ring signals from said plurality of access lines, said control unit provides different ringing tones to said plurality of stations for differentiating between said plurality of access lines.

11. The interface device of claim 1, wherein said control unit provides configurable default connections of said plurality of stations to one or more of said plurality of access lines when power to said interface device is interrupted.

12. The interface device of claim 1, wherein any one of said plurality of stations answers an incoming call from any one of said plurality of access lines.

13. The interface device of claim 1, wherein said control unit bridges any one of said plurality of stations onto another of said plurality of stations which is connected to one of said plurality of access lines.

14. The interface device of claim 1, wherein said switching network selectively connects a selected number of said plurality of line access modules to a chosen number of said plurality of station access modules.

15. The interface device of claim 1, wherein said switching network selectively connects one of said plurality of line access modules to a selected number of said plurality of station access modules.

16. The interface device of claim 1, wherein said switching network simultaneously connects a number of said plurality of line access modules to said number of said plurality of station access modules.

17. The interface device of claim 1, wherein said switching network simultaneously connects a number of said plurality of line access modules to said plurality of station access modules.

18. The interface device of claim 1, wherein said switching network simultaneously connects a number of said plurality of line access modules to said number of said plurality of station access modules for simultaneously providing said number of connected communication links.

19. The interface device of claim 1, wherein said switching network provides a connection between a first station of said plurality of stations and a first access line of said plurality of access lines when said first station is off-hook.

20. The interface device of claim 1, wherein said switching network alternatively provides a first station of said plurality of stations with connections to a number of access lines of said plurality of access lines, one of said connections being active at any one time, while other of said connections being on hold.

21. The interface device of claim 1, wherein one of said plurality of access lines provides a dial tone to one of said plurality of stations when said one station is off-hook.

22. The interface device of claim 1, wherein said switching network connects said at least one line access module to said at least one station access module before dialing begins from one of said plurality of stations.

23. The interface device of claim 1, wherein said switching network connects said at least one line access module to said at least one of station access module when one of said plurality of stations is off-hook.

24. The interface device of claim 1, wherein each of said plurality of line access modules comprises:
   a ring detect circuit which detects a ring current from one of said plurality of access lines and converts the ring current to a digital logic signal which is provided to the control unit;
   a current sense circuit which detects when said one access line is active; and
   a hold circuit which provides a path for a line current when the respective access line is on hold.

25. The interface device of claim 1, wherein each of said plurality of station access modules comprises:
   a current detect module which alerts the control unit when a respective one of said plurality of stations is off hook; and
   a local office unit which simulates said respective one of said plurality of stations.

26. A multi-line and station interface device for providing multi-line access to a plurality of customer stations, said interface device enabling simultaneous connection of said plurality of customer stations to a plurality of service providers, said interface device comprising:

a plurality line access modules, each individually connected to a respective communication line provided by one of said plurality of service providers;

a plurality station access modules, each individually connected to at least one of said plurality of customer stations;

a configurable bus switching device for connecting signals between one or more of said plurality of line access modules and one or more of said plurality of station access modules;

a control device for enabling said bus switching device to route communication signals emanating from one of said plurality of customer stations to one of said plurality of service providers; and a speech synthesizer for providing an audio signal to said plurality of customer stations indicating status of said multi-line and station interface device.

27. The multi-line and station interface device for routing communication signals of claim 26, wherein said switching device is configurable to route communication signals in a predetermined order.

28. The multi-line and station interface device of claim 26, whereupon a request from one of said plurality of customer stations to place a station call, said control device establishes a connection with a dial tone provided by one of said plurality of service providers.

29. The multi-line and station interface device of claim 28, wherein said control device establishes connection with the dial tone provided by a user-selected service provider.

30. The multi-line and station interface device claim 28, wherein there are at least two of said plurality of service providers, and whereupon a request from one of said plurality of customer stations to place a predetermined station call, said control device establishes the connection with the dial tone provided by a first one of said plurality of service providers in accordance with a predetermined sequence.

31. The multi-line and station interface device of claim 30, wherein a second one of said plurality of service providers is a local exchange company.

32. The multi-line and station interface device of claim 30, wherein said predetermined station call is one of an operator service, information service, emergency service, and long distance call.

33. The multi-line and station interface device of claim 30, wherein said first service provider of said plurality of service providers is a long distance service provider.

34. The multi-line and station interface device claim 26, wherein an incoming call from one of said plurality of service providers is routed through said bus switching device to each of said plurality of customer stations that are available for use.

35. The multi-line and station interface device claim 26, wherein there are at least two of said plurality of service providers, and wherein a first one and a second one of said plurality of service providers generate respective first and second audible tones for communication to a customer station of said plurality of customer stations that is in use, said first service provider generating said first audible tone for receipt by said customer station when an incoming call is provided by said first service provider, and, said second service provider generating said second audible tone for receipt by said customer station when an incoming call is provided by said second service provider.

36. The multi-line and station interface device of claim 26, wherein said plurality of line access modules are adapted to respectively accommodate a plurality of Multiple System Operators.

37. The multi-line and station interface device claim 26, wherein said one or more line access modules are adapted to accommodate one or more Hybrid Fiber Coax connections respectively.

\* \* \* \* \*